United States Patent [19]
Morterol

[11] Patent Number: 5,922,818
[45] Date of Patent: *Jul. 13, 1999

[54] PROCESS FOR A GAS PHASE OLEFIN POLYMERIZATION

[75] Inventor: Frederic Robert Marie Michel Morterol, Sausset-les-Pins, France

[73] Assignee: BP Chemicals Limited, London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/755,825

[22] Filed: Nov. 26, 1996

Related U.S. Application Data

[30] Foreign Application Priority Data

Nov. 29, 1995 [FR] France .................................... 95 14720

[51] Int. Cl.$^6$ ....................................................... C08F 2/34
[52] U.S. Cl. .............................. 526/88; 526/90; 526/901; 502/523
[58] Field of Search ............................... 526/88, 90, 901; 502/523

[56] References Cited

U.S. PATENT DOCUMENTS

| | | | |
|---|---|---|---|
| 4,200,715 | 4/1980 | Lynch et al. ................................ | 526/88 |
| 4,610,574 | 9/1986 | Peters ........................................... | 406/50 |
| 5,098,667 | 3/1992 | Young et al. ............................ | 422/111 |

FOREIGN PATENT DOCUMENTS

| | | |
|---|---|---|
| 0495300 A1 | 7/1992 | European Pat. Off. . |
| 2705252 | 11/1994 | France . |
| 79915 | 12/1978 | Luxembourg . |
| WO94/28032 | 12/1994 | WIPO . |

*Primary Examiner*—David W. Wu
*Attorney, Agent, or Firm*—Finnegan, Henderson, Farabow, Garrett & Dunner, L.L.P.

[57] ABSTRACT

The present invention relates to a process for introducing a solid catalyst into a gas-phase olefin polymerization reactor. It comprises in particular storing the catalyst in the form of a dry powder in a hopper, withdrawing from the hopper a measured amount of the said catalyst, introducing the said amount of the catalyst and a liquid hydrocarbon into a mixing chamber, mixing the said catalyst with the said liquid hydrocarbon so as to form in the said chamber a suspension of the entrained catalyst with the said liquid hydrocarbon, and introducing the said suspension into the said reactor. In a preferred form, the liquid hydrocarbon is continuously introduced into the chamber and forms a continuous stream to which is added the measured amount of the catalyst and which flows into the reactor.

11 Claims, 8 Drawing Sheets

PROCESS FOR A GAS PHASE OLEFIN POLYMERIZATION

BACKGROUND OF THE INVENTION

The present invention relates to a process for the introduction of a catalyst into a gas-phase olefin polymerization reactor, in particular into a fluidized bed reactor.

The catalysts used in gas-phase olefin polymerizations are often provided in the solid state. The solid catalysts can be kept either in the form of a suspension in a liquid hydrocarbon or in the form of a dry powder. Now, it has been observed that some solid catalysts which are particularly active in polymerization have properties which deteriorate when they are kept in suspension. There therefore appears a need to keep solid catalysts in the form of a dry powder. Moreover, many catalysts are now manufactured and delivered in this form because they can be transported and handled more easily.

It is known that solid catalysts used in the form of a dry powder are generally introduced in this form into gas-phase olefin polymerization reactors using in particular a gaseous fluid such as a carrier gas, for example nitrogen, hydrogen, a gaseous olefin or a mixture of these gases. This method of introduction, carried out entirely in the absence of liquid, is, for example, described in French Patent Application FR-2,705,252-A. However, it has been observed that this method of introduction can cause one or a number of problems characterized in particular by the use of large volumes of gaseous fluids introduced with the catalyst into the reactor, an insufficiently homogeneous dispersion of the catalyst in the reactor, an excessive entrainment of the catalyst out of the fluidized bed, and the appearance of hot spots, both in the fluidized bed and above the bed. These problems can arise separately or simultaneously, depending on the type of catalyst used, in particular depending on the composition or the size of the catalyst.

Patent Application of Luxembourg LU-A-79915 discloses a process for introducing a solid catalyst into a liquid phase polymerization reactor. The catalyst in the form of a dry powder is contacted with a liquid in two successive settling zones wherein the catalyst falls by gravity under the protection of the liquid. Contacting the catalyst in the form of a dry powder with the liquid neither produces any mixing of entrained catalyst with the said liquid, nor forms a suspension of the catalyst in the said liquid. In such a contacting step, the liquid is used as a screen for protecting the catalyst, and not as a carrier for suspending and transporting the catalyst into the polymerization reactor. Once the catalyst falls by gravity through the settling zones under the protection of the liquid, it is then entrained into the polymerization reactor with the help of a liquid stream. The process thus involves relatively large amounts of liquid which may affect the catalyst activity.

A process has now been found which makes it possible to very substantially reduce or even to completely avoid the above-mentioned problems. The process has the advantage of being able to make use of catalysts which are different both in their composition and in their size and providing a more universal process which makes it possible to use different catalysts in the same reactor.

SUMMARY OF THE INVENTION

More particularly, the present invention relates to a process for introducing a solid catalyst into a gas-phase olefin polymerization reactor through which passes a gaseous reaction mixture containing at least one olefin to be polymerized, which process is characterized in that it comprises:

storing under an inert atmosphere the solid catalyst in the form of a dry powder in a hopper, withdrawing under an inert atmosphere from the hopper a measured amount of the catalyst in the form of a dry powder, introducing the measured amount of the catalyst in the form of a dry powder and a liquid hydrocarbon into a mixing chamber, mixing the said catalyst with the said liquid hydrocarbon in the mixing chamber so as to form in the said chamber a suspension of the entrained catalyst with the said liquid hydrocarbon, and introducing the said suspension into the gas-phase olefin polymerization reactor.

DETAILED DESCRIPTION OF THE INVENTION

The solid catalyst can be a catalyst containing a transition metal belonging to group IV, V or VI of the Periodic Classification of the elements, such as titanium, vanadium, chromium, zirconium or hafnium. It can be in particular a catalyst of Ziegler-Natta type containing one or a number of transition metals, especially those mentioned above, in the halogenated compound form. The catalyst of Ziegler-Natta type may preferably be a catalyst comprising a halogenated compound of at least one of these transition metals, combined with a magnesium compound and optionally a porous support, such as silica.

The solid catalyst can also be a high-activity catalyst of metallocene type, which can be, for example, represented by the general formula in which Cp represents a substituted or unsubstituted cyclopentadienyl ring, M represents a transition metal from group IV, V or VI of the Periodic Classification of the elements, such as zirconium, titanium or hafnium, R and $R^1$, being identical or different, represent a hydrocarbon radical containing from 1 to 20 carbon atoms, a halogen atom or another monovalent ligand, m=1 to 3, x=0 to 3 and y=0 to 3, provided that the sum of m, x and y is equal to the oxidation state of M. Metallocene-type catalyst examples are found in EP-0,129,368, U.S. Pat. No. 5,324,800 and EP-0,206,794.

The solid catalyst can also be a high-activity catalyst, represented by a compound containing a monocyclopentadienyl heteroatom. Such a catalyst is, for example, disclosed in EP-0,416,815 and EP-0,420,436.

The catalysts of Ziegler-Natta type, in particular the high-activity catalysts and in particular the catalysts of metallocene type, are preferably used on a porous support, such as a refractory oxide, for example silica or alumina.

These high-activity catalysts are generally used in the presence of a cocatalyst such as an alkylaluminium, in particular an aluminoxane. Other cocatalysts can also be trialkylaluminium compounds, ionic activators or compounds which ionize the catalysts, for example boranes.

The solid catalyst can also be a high-activity catalyst based on a chromium oxide supported on a refractory oxide, such as silica, and activated by a heat treatment.

The solid catalyst used in the present invention can also have been brought beforehand into contact with at least one olefin, such as ethylene or propylene, under conditions where the olefin partially or completely polymerizes. The catalyst in this case can be used in the form of a prepolymer, i.e. a catalyst prepolymerized using olefin containing, for example, from 0.01 to 200, preferably from 0.1 to 100, g of polyolefin per millimole of transition metal.

The process comprises the storage of the solid catalyst in the form of a dry powder, that is to say a powder which is substantially free from liquid, containing, for example, less than 30% and preferably less than 20% or 10% by weight of liquid. The catalyst particles can have a mean diameter by mass of 20 to 250, preferably of 20 to 200 and more especially of 30 to 150 $\mu$m.

The catalyst powder is stored in a hopper under an inert atmosphere, such as nitrogen. The pressure, P1, of the hopper is preferably greater than the pressure, P2, prevailing in the polymerization reactor.

The process comprises the withdrawal from the hopper of a measured amount of the catalyst in the form of a dry powder, under an inert atmosphere. The measured amount can range, for each withdrawal, from 1 to 2,000 g of catalyst, in particular from 1 to 500 and preferably from 20 to 200 g of catalyst, when it concerns a non-prepolymerized catalyst, or alternatively from 20 to 2,000 and preferably from 50 to 1,500 g of catalyst, when it concerns a prepolymerized catalyst as described above.

The withdrawal can be carried out by transfer under an inert atmosphere of the catalyst in the form of a dry powder from the storage hopper to a zone connected to the said hopper, either by a pressure difference between the hopper and the zone or by gravity or by both means simultaneously, and by isolation in the zone of the measured amount of the catalyst in the form of a dry powder. The zone can be essentially composed of a chamber isolated by inlet and outlet valves, the inlet valve being in communication with the storage hopper, in particular the bottom of the hopper, and the outlet valve with a mixing chamber as described below. The zone used for withdrawing the measured amount of catalyst can also be essentially composed of a cavity hollowed out in a cylindrical, frustoconical or preferably spherical plug of a valve alternately bringing (a) the storage hopper into communication with the cavity, in order to fill the latter with the catalyst powder, and (b) the cavity thus filled with catalyst into communication with a mixing chamber as described below, in order to empty the cavity and to introduce the measured amount of catalyst into the said mixing chamber.

The process also comprises the introduction of the measured amount of the catalyst in the form of a dry powder into a mixing chamber. The introduction of the catalyst can be carried out either by gravity, the catalyst charge being allowed to fall into the mixing chamber, or by a pressure difference or both means simultaneously, for example using a pressurized fluid which drives the catalyst from the space where the catalyst has been withdrawn and which pushes the catalyst charge into the mixing chamber. However, preference is given to introduction by simple gravity, in particular when the catalyst powder is capable of flowing freely. The mixing chamber has a volume which can be markedly greater than the volume of the measured amount of catalyst at rest and which can, for example, be from 2 to 100 times, preferably from 5 to 50 times, the volume of the measured amount of catalyst at rest.

The process comprises the introduction of a liquid hydrocarbon into the mixing chamber. It also comprises mixing in the chamber the catalyst in the form of a dry powder with the liquid hydrocarbon so as to form in the said chamber a suspension of the entrained catalyst with the said liquid hydrocarbon. The main function of the introduction of the liquid is preferably to produce a mixing of the catalyst with the liquid hydrocarbon, to form a suspension of the entrained catalyst with the liquid hydrocarbon, to entrain and to introduce the suspension thus formed into the polymerization reactor and to improve the introduction of the catalyst into the reactor. The introduction of the liquid hydrocarbon and the mixing of the catalyst with the liquid hydrocarbon are preferably carried out so as to keep the catalyst in suspension in the chamber and to keep the catalyst entrained with the liquid hydrocarbon when it is introduced into the reactor. In particular, the liquid hydrocarbon can be introduced into the chamber so as to create a liquid stream, preferably a vortical or cyclonic stream, suitable in particular to mix the catalyst with the liquid hydrocarbon, to form a suspension of the entrained catalyst with the liquid hydrocarbon, to keep the catalyst in, suspension and to entrain it with the liquid hydrocarbon into the reactor. Such a process has the advantage of not making use of mechanical stirring for forming the suspension. Thus, the agitation created by the liquid stream can be sufficient to form the suspension and to entrain the catalyst with the liquid hydrocarbon into the reactor.

The liquid hydrocarbon can be introduced into the chamber non-continuously or, preferably, continuously.

In particular, the non-continuous introduction of liquid can generally be carried out for a period of time at least equal to, or preferably greater than, the period of time for introduction of the catalyst charge, for example a period of time from 1.5 to 20 times, preferably from 2 to 10 times, greater than the period of time for introduction of the measured amount of catalyst.

Figure 1A:
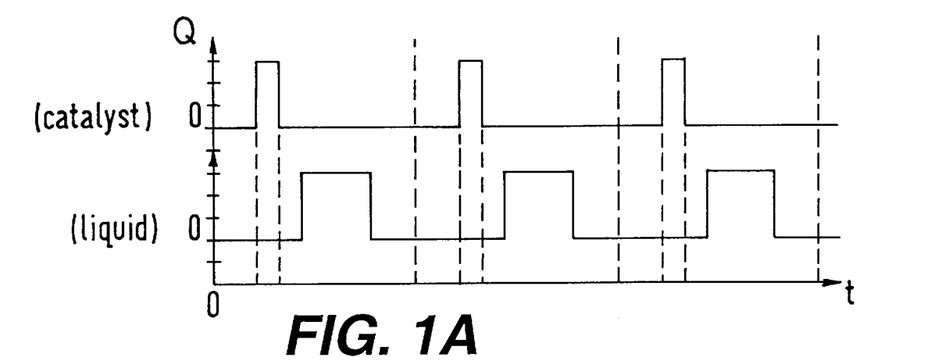
FIGS. 1A to 1C represent histograms relating to the non-continuous and periodic introductions with time of the liquid hydrocarbon and of the measured amount of catalyst into the mixing chamber, over a period, for example, of 3 successive cycles.
Figure 1B:
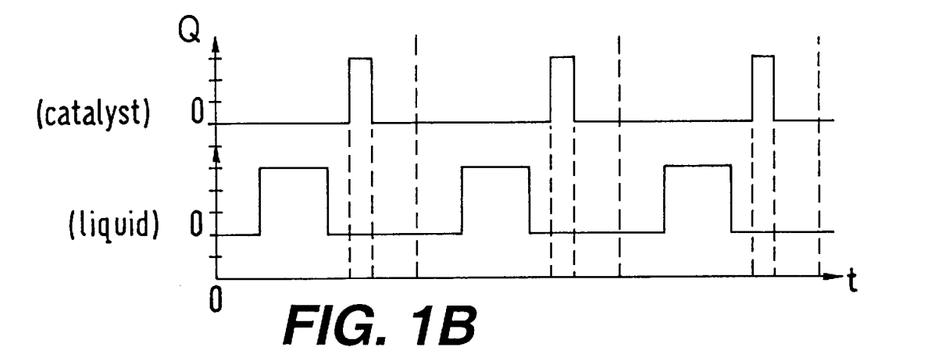
Figure 1C:
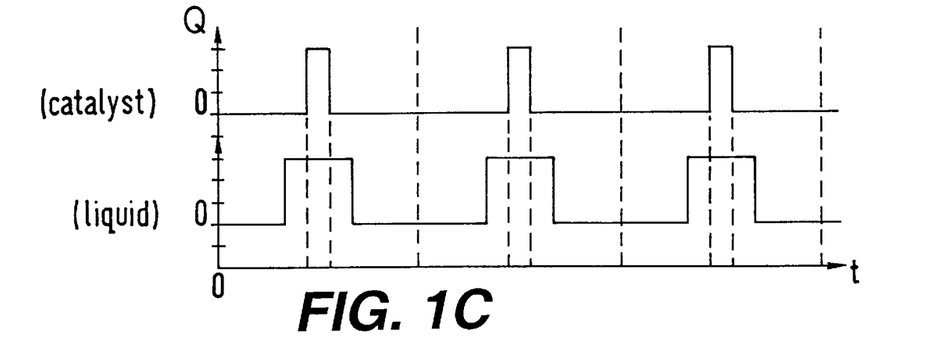

The non-continuous introduction of liquid and that of the measured amount of catalyst can be carried out in various ways, for example according to the histograms of FIGS. 1A, B and C in which represent, periodically with time (over a period of 3 successive cycles, by way of example), the introduction of liquid and of catalyst into the chamber, the abscissa t representing the time and the ordinate Q the flow rates for introduction of liquid and of catalyst. Each cycle comprises the discharge of the suspension from the chamber and its introduction into the reactor (not represented in the histograms). Thus, the introduction of catalyst into the chamber can be carried out before, after or during the introduction of liquid, for example according to the histograms FIGS. 1A, B and C respectively in However, it is preferable to carry out the introduction of catalyst after, or more particularly during, the introduction of liquid. According to one of the preferred methods, the introduction of the measured amount of catalyst into the chamber can be carried out simultaneously with introduction of the liquid into the said chamber, or preferably during part of the period of time for introduction of the liquid, in particular after the beginning of the introduction of the liquid.

Thus, according to one of the preferred methods, the process can comprise:

storing under an inert atmosphere the solid catalyst in the form of a dry powder in a hopper, withdrawing under an inert atmosphere from the said hopper a measured amount of the catalyst in the form of a dry powder, introducing a liquid hydrocarbon into a mixing chamber, adding the measured amount of the catalyst in the form of a dry powder to the liquid hydrocarbon in the mixing chamber, mixing the said catalyst with the said liquid hydrocarbon in the mixing chamber as to form in the said chamber a suspension of the entrained catalyst with the said liquid hydrocarbon, and introducing the said suspension into the gas-phase olefin polymerization reactor.

In this case, the storage of the catalyst, the withdrawal of the measured amount of catalyst, the introduction of the liquid into the chamber and the mixing of the catalyst with the liquid are carried out in a way identical to that which has been described above. It is in particular preferable that the period of time for introduction of the liquid should be at least equal to, or preferably greater than, that for the addition of the catalyst to the liquid, for example according to periods of time which are identical to those described above for the introductions of catalyst and of liquid into the chamber. Moreover, it is preferable to carry out the addition of the measured amount of catalyst to the liquid simultaneously with introduction of the liquid into the chamber or preferably during part of the period of time for introduction of the liquid into the chamber, in particular after the beginning of the introduction of the liquid.

It is preferable to introduce the liquid continuously into the chamber and thus to add the measured amount of catalyst to the liquid introduced continuously into the chamber.

Thus, according to another preferred alternative form, the process can comprise:

storing under an inert atmosphere the solid catalyst in the form of a dry powder in a hopper, withdrawing under an inert atmosphere from the hopper a measured amount of the catalyst in the form of a dry powder, continuously introducing a liquid hydrocarbon into a mixing chamber so as to form a continuous stream of the liquid hydrocarbon passing through the chamber and flowing into the polymerization reactor, adding the measured amount of the catalyst in the form of a dry powder to the continuous stream of the liquid hydrocarbon in the mixing chamber so as to mix the said catalyst with the said liquid hydrocarbon and to form in the said chamber a suspension of the said catalyst with the said liquid hydrocarbon, and introducing the said suspension entrained by the continuous stream of the liquid hydrocarbon into the gas-phase olefin polymerization reactor.

Figure 2A:
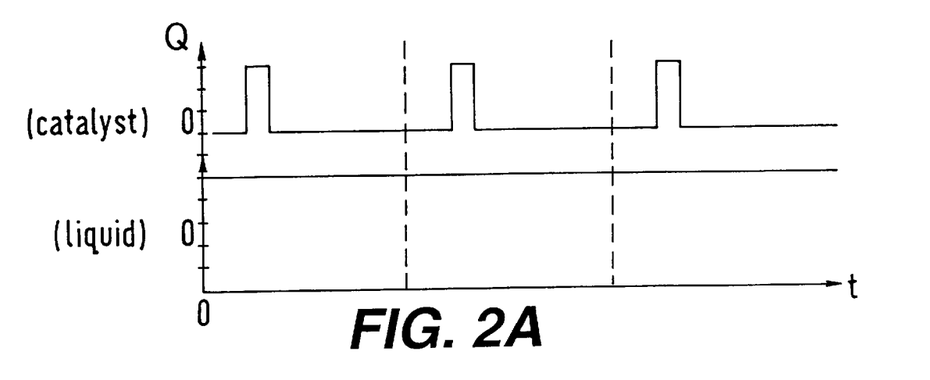
FIGS. 2A and B represent histograms relating to the continuous introduction of the liquid hydrocarbon and to the non-continuous and periodic introduction with time of the measured amount of catalyst into the mixing chamber.
Figure 2B:
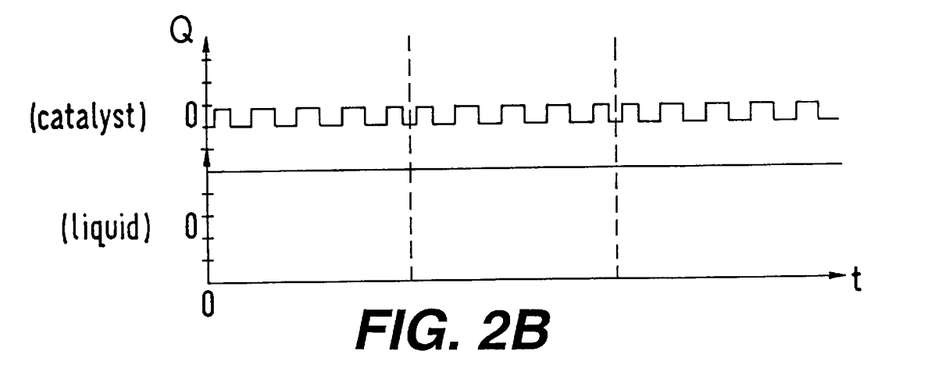

In this case, the storage of the catalyst, the withdrawal of the measured amount of catalyst and the introduction of the liquid into the chamber, apart from the continuous way of introducing it, are carried out in a way identical to that which has been described above. In particular, it is preferable to introduce, into the chamber, a continuous vortical or cyclonic stream of liquid to which is intermittently added, for example periodically, the measured amount of the catalyst in the form of a dry powder. The addition of the catalyst to the liquid is non-continuous, preferably periodic, but each addition can be brought sufficiently close to the previous one with time, so that a catalyst suspension in the chamber is produced semi-continuously or substantially continuously and so that the catalyst is thus introduced substantially continuously into the reactor. The histograms of FIGS. 2A and B represent a continuous introduction of liquid and a non-continuous and periodic introduction of catalyst into the chamber (over a period, by way of example, of 3 successive cycles), that is to say a non-continuous and periodic addition of catalyst to the liquid introduced continuously into the chamber, the abscissa t representing the time and the ordinate Q the flow rates for introduction into or for addition to the chamber of the liquid and of the catalyst. The histogram of FIG. 2B shows a preferred alternative form with respect to FIG. 2A in which each catalyst addition can be brought closer with time to the previous one with the aim of producing a substantially continuous introduction of the catalyst into the reactor.

The liquid hydrocarbon is advantageously a relatively volatile liquid under the polymerization conditions in the gas-phase reactor, in particular in a fluidized bed. The liquid hydrocarbon is in particular chosen so that it can instantaneously or very quickly evaporate as soon as it enters into the fluidized bed, in particular into the region of the bed where the temperature is substantially constant and highest.

The liquid hydrocarbon can be a liquid which is inert with respect to the catalyst, for example at least one saturated hydrocarbon, in particular a $C_2$ to $C_8$ hydrocarbon, such as one or a number of alkanes or cycloalkanes, in particular a $C_2$ to $C_8$ alkane, preferably a $C_3$ to $C_7$ alkane, for example n-pentane and/or isopentane. The liquid hydrocarbon can also be at least one unsaturated hydrocarbon, for example a $C_2$ to $C_{10}$ hydrocarbon, such as at least one liquid, in particular $C_2$ to $C_{10}$, preferably $C_3$ to $C_8$, olefin or non-conjugated diene, for example propylene, 1-butene, 1-hexene, 4-methyl-1-pentene, 1-octene, ethylidenenorbornene, 4-methyl-1,4-hexadiene, 2-methyl-1, 5-hexadiene or 1,4-hexadiene, or alternatively a mixture of one or a number of olefins or dienes, in particular $C_2$ to $C_{10}$ olefins or dienes, with at least one inert liquid hydrocarbon, such as at least the saturated $C_2$ to $C_8$ hydrocarbon.

The liquid hydrocarbon can preferably be at least a portion of a liquid obtained by cooling and condensation of at least a part of the gaseous reaction mixture which passes through the gas-phase olefin polymerization reactor and is returned to the said reactor, and which contains in particular the olefinic monomer or monomers to be polymerized, such as the olefins and the non-conjugated dienes mentioned above, and optionally one or a number of saturated hydrocarbons, such as the alkanes or cycloalkanes mentioned above, and by separation of the cooled gaseous reaction mixture, which is recycled to the said reactor. The liquid hydrocarbon can in particular be that obtained by cooling, condensation and separation of the recycled gaseous reaction mixture, such as described in Patent Application PCT No. WO 94/28032, published on Dec. 8, 1994. Part of this liquid can be used as liquid hydrocarbon in the present invention and can advantageously be introduced continuously into the mixing chamber as described above.

The amount of liquid hydrocarbon introduced into the chamber is sufficient to suspend the catalyst i.e. to form a suspension of the catalyst in the liquid hydrocarbon and preferably to entrain the suspension as far as into the polymerization reactor. The chamber and the device connecting the chamber to the reactor can be rinsed using the liquid hydrocarbon at the end of each non-continuous introduction of liquid. Generally, the total amount of liquid hydrocarbon used per gram of catalyst (prepolymerized or non-prepolymerized) to be introduced with the catalyst into the reactor can be from 5 to 100 and preferably from 10 to 50 cm$^3$.

The liquid hydrocarbon is introduced into the chamber under a pressure P3 greater than the pressure P2 existing in the polymerization reactor and preferably equal to or less than the pressure P1 existing in the storage hopper. By way of example, P3 can be from 1.02 to 2 times, preferably from 1.03 to 1.5 times and in particular from 1.04 to 1.1 times greater than P2. P1 can be from 1.0 to 2.0 times and preferably from 1.02 to 1.2 times greater than P3.

The process of the invention also comprises the introduction of the suspension into the reactor. Generally, the catalyst suspension can be introduced using a pipe connecting the chamber to the reactor. During its introduction, the catalyst is generally kept entrained with the liquid in order to avoid it settling out between the chamber and the reactor. In particular, it has been observed that the vortical or cyclonic effect produced by the introduction of the liquid into the chamber can be sufficient to keep the catalyst entrained with the liquid. In addition, the suspension can be introduced into the reactor by gravity or preferably by a pressure difference between the chamber and the reactor or alternatively by both means at the same time. The pressure P2 in the reactor is generally greater than atmospheric pressure: it can range in particular from 0.2 MPa to 6 MPa and preferably from 1 to 4 MPa (in absolute pressure). In the case of an introduction by a pressure difference, the pressure in the chamber is greater than the pressure P2 of the reactor: it can be in particular from 1.01 to 2 times and preferably from 1.05 to 1.5 times greater than P2. The total period of time for producing the catalyst suspension in the liquid and for carrying out the transfer of the suspension from the chamber into the reactor is generally very short, of the order of a few seconds, for example from 0.5 to 10 and preferably from 0.5 to 5 seconds.

A gas-phase polymerization reactor generally contains an agitated and/or preferably fluidized bed, the bed being composed essentially of particles of catalyst and of polymer in the course of formation. The catalyst suspension is preferably introduced directly into the bed. In the preferred case of a fluidized bed reactor which generally comprises a vertical cylinder equipped at its base with a fluidization grid, the catalyst suspension is directly introduced into the fluidized bed, that is to say at a point located above the fluidization grid and below the top of the bed. It is preferable to introduce the suspension into the region of the bed where the temperature is substantially constant and highest and in particular into the lower half of the bed, for example into the region beginning at 0.7 m and preferably at 1 m above the fluidization grid and extending up to half the height of the bed.

The catalyst suspension can be introduced using a pipe connecting the chamber to the reactor. The pipe can emerge on the internal wall of the reactor or even enter inside the reactor, that is to say preferably inside the bed. At the place where the pipe emerges or enters into the reactor, it can be directed downwards and form with a vertical plane and in particular with the vertical wall of the reactor an angle of 10 to 80° and preferably of 20 to 70°. The pipe can have an internal diameter ranging from 5 to 30 and preferably from 10 to 25 mm.

The pipe can be equipped with at least one valve located close to the reactor in order to isolate the chamber from the reactor, in particular for reasons of safety and to avoid material rising up from the bed inside the pipe during the non-continuous steps where the suspension is not introduced into the reactor.

The pipe can also be equipped with a valve located close to the outlet of the chamber, in particular when the liquid is introduced non-continuously into the chamber. In this case, this valve can be opened before or after or even simultaneously with the beginning of the introduction of the liquid hydrocarbon into the chamber, so as to bring the chamber into communication with the reactor, and can be closed before or after or even simultaneously with the end of the introduction of the liquid hydrocarbon into the chamber, so as to isolate the chamber from the reactor. An alternative form can consist in opening the valve simultaneously with the beginning of the introduction of the liquid hydrocarbon into the chamber and in closing it simultaneously with the end of this introduction. An alternative form which is preferred can consist in opening the valve after the beginning of the introduction of the liquid hydrocarbon, so that at least the bottom of the chamber is filled with liquid and so that the catalyst is easily suspended therein, and then in closing the valve before the end of the introduction of liquid, so as to keep a liquid heel in the chamber for the following cycle. Another alternative form which is also preferred can consist in opening the valve before the beginning of the introduction of the liquid hydrocarbon and in closing it before the end of this introduction. In the case of a continuous introduction of the liquid hydrocarbon into the chamber, the valve is not necessary or can be left constantly open. In this case, a continuous stream of the liquid hydrocarbon passes through the chamber and flows into the reactor, while the measured amounts of catalyst are intermittently or semi-continuously added to the continuous stream passing into the chamber.

It was observed that, by thus making use of the process of the present invention, the problems posed by the introduction of solid catalyst in the form of a dry powder in the absence of liquid were solved. In particular, it was observed that the catalyst could be easily suspended in the liquid hydrocarbon and introduced into the reactor and that carrying out both of these operations in the same process did not prejudice the good dispersion of the catalyst in the reactor and in particular in the bed where the polymerization takes place. It was thus observed that this process did not require making use of a large amount of liquid.

Figure 3:
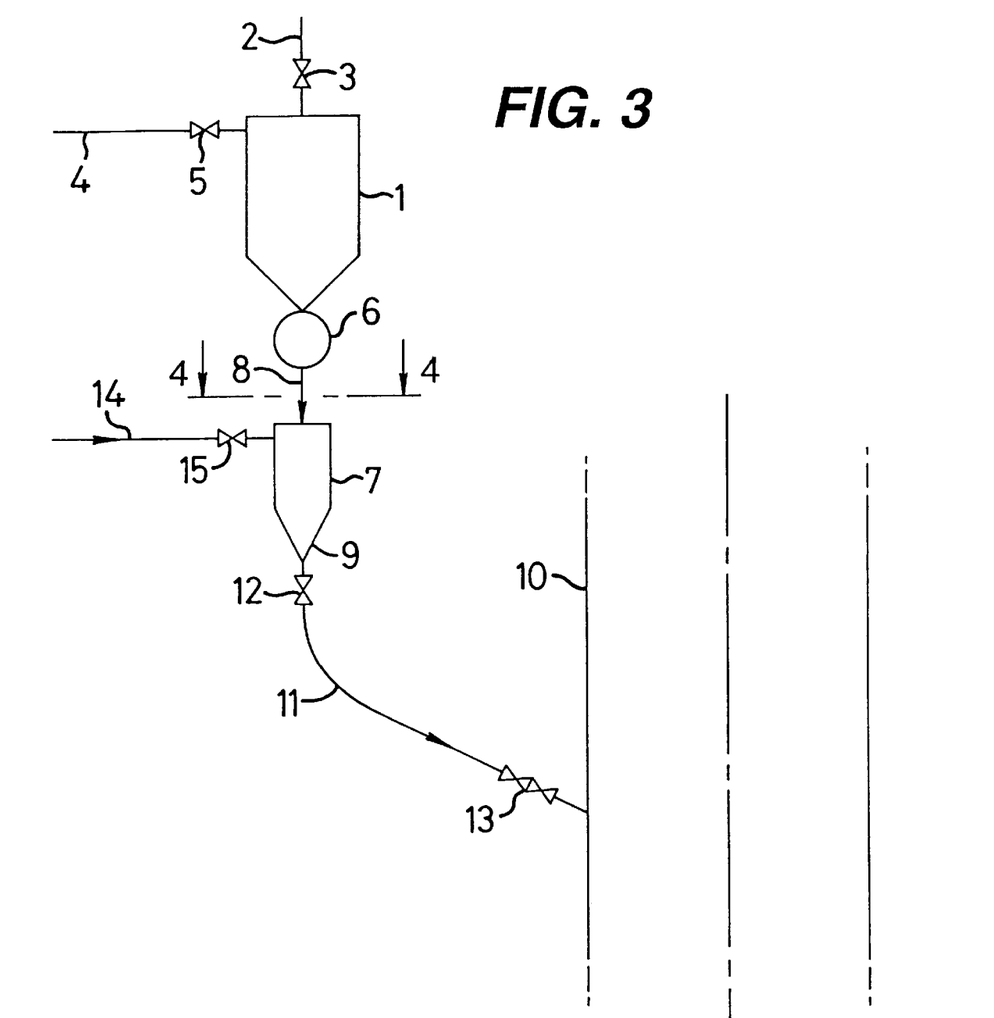
FIG. 3 diagrammatically represents a device which can be made use of in the process of the invention.

FIG. 3 diagrammatically represents a device which can be made use of in the process of the invention. It shows a storage hopper (1) for the solid catalyst in the form of a dry powder, which hopper is supplied with solid catalyst via a line (2) equipped with a valve (3) and with an inert gas, such as nitrogen, via a line (4) equipped with a valve (5). The base of the hopper (1) is in communication with a zone (6) composed of a cavity hollowed out in a spherical plug of a valve, which cavity makes it possible to withdraw a predetermined volume of catalyst stored in the hopper (1), to isolate this volume of catalyst from the hopper (1) and to deliver it into a mixing chamber (7) via a line (8). The chamber (7) is composed essentially of a vertical cylindrical part closed at its top, where the line (8) emerges, and terminated by a conical bottom (9), the lower end of which is in communication with a gas-phase polymerization reactor (10) via a pipe (11). The pipe (11) is equipped with a valve (12) close to the bottom (9) of the chamber and with a pair of valves (13) close to the reactor (10). A line (14) for introduction of a liquid hydrocarbon, equipped with a valve (15), emerges in the upper part of the chamber (7).

Figure 4:
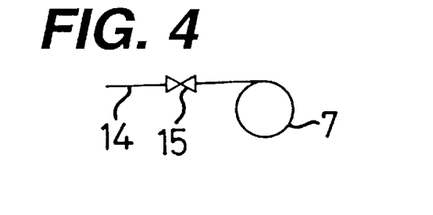
FIG. 4 diagrammatically represents a cross section taken along the line 4—4 of the mixing chamber shown in FIGS. 3 or 5.
Figure 5:
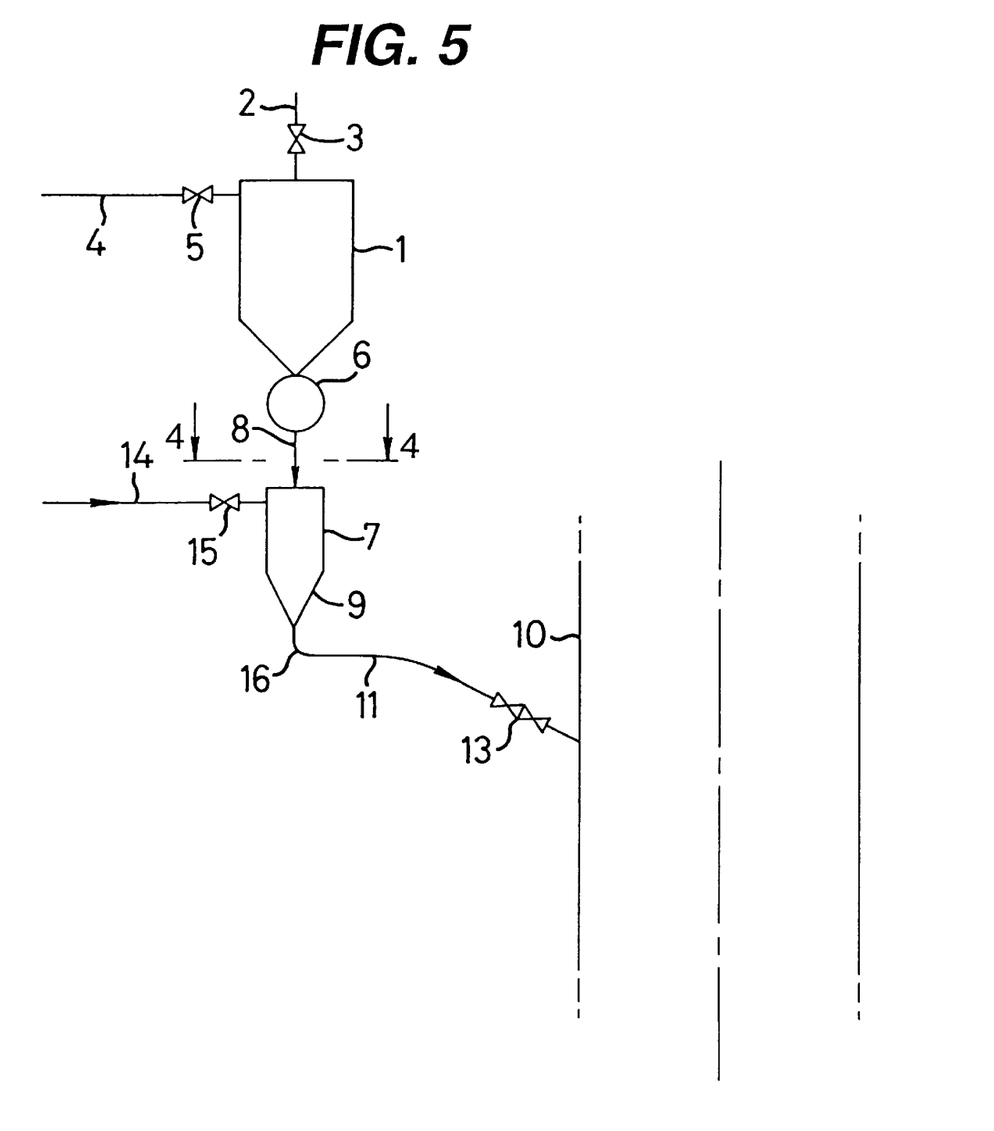
FIG. 5 diagrammatically represents another device which can be made use of in the process of the invention.

FIG. 4 diagrammatically represents the a cross section taken along lines 4-4 of the chamber (7) shown in FIGS. 3 and 5. The line (14) emerges tangentially to the vertical wall of the chamber (7), so as to create a vortical or cyclonic stream capable of suspending the solid catalyst in the liquid hydrocarbon.

FIG. 5 diagrammatically represents another device which can be made use of in the process of the invention. It shows the same components with the same references as those described in FIG. 3, except for the fact that the pipe (11) does not have a valve (12) but has an elbow which forms an angle of 90° and which has a small radius. This device can in particular be used when the liquid hydrocarbon is introduced continuously into the chamber (7) via the line (14).

Figure 6:
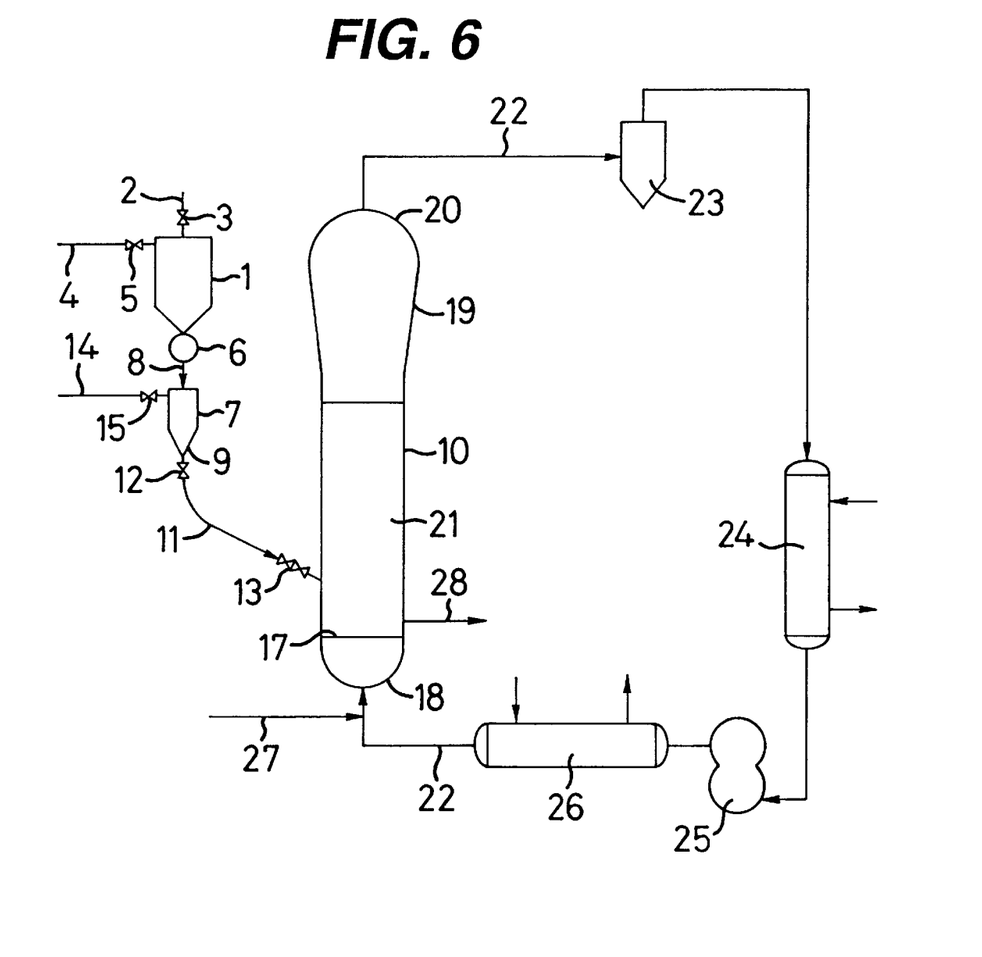
FIGS. 6, 7, 8 and 9 diagrammatically represent various gas-phase olefin polymerization installations which use a fluidized bed reactor and which make use of the process of the invention for introducing a catalyst into the reactor.

FIG. 6 diagrammatically represents a gas-phase olefin polymerization installation which uses a fluidized bed reactor (10) and the device for introduction of catalyst represented in FIG. 3 with the same components and the same references. The reactor (10) is composed essentially of a vertical cylinder containing a fluidization grid (17) at its base and of a hemispherical bottom (18) and, in its upper part, of a tranquillization zone (19) terminated by a hemispherical top (20). The reactor (10) contains a fluidized bed (21). A line (22) for recycling the gaseous reaction mixture passing through the bed (21) leaves via the top (20) of the reactor in order to return to the bottom (18) of the reactor. The line (22) successively contains, in the direction of flow of the recycled gaseous reaction mixture, a cyclone (23) which makes it possible to stop the fine particles entrained with the gaseous reaction mixture out of the bed (21), a first heat exchanger (24), a compressor (25) and a second heat exchanger (26). The balance of fresh gas constituting the gaseous reaction mixture is introduced via the line (27) emerging into the line (22). A line (28) makes it possible to discharge the polymer manufactured in the reactor (10).

Figure 7:
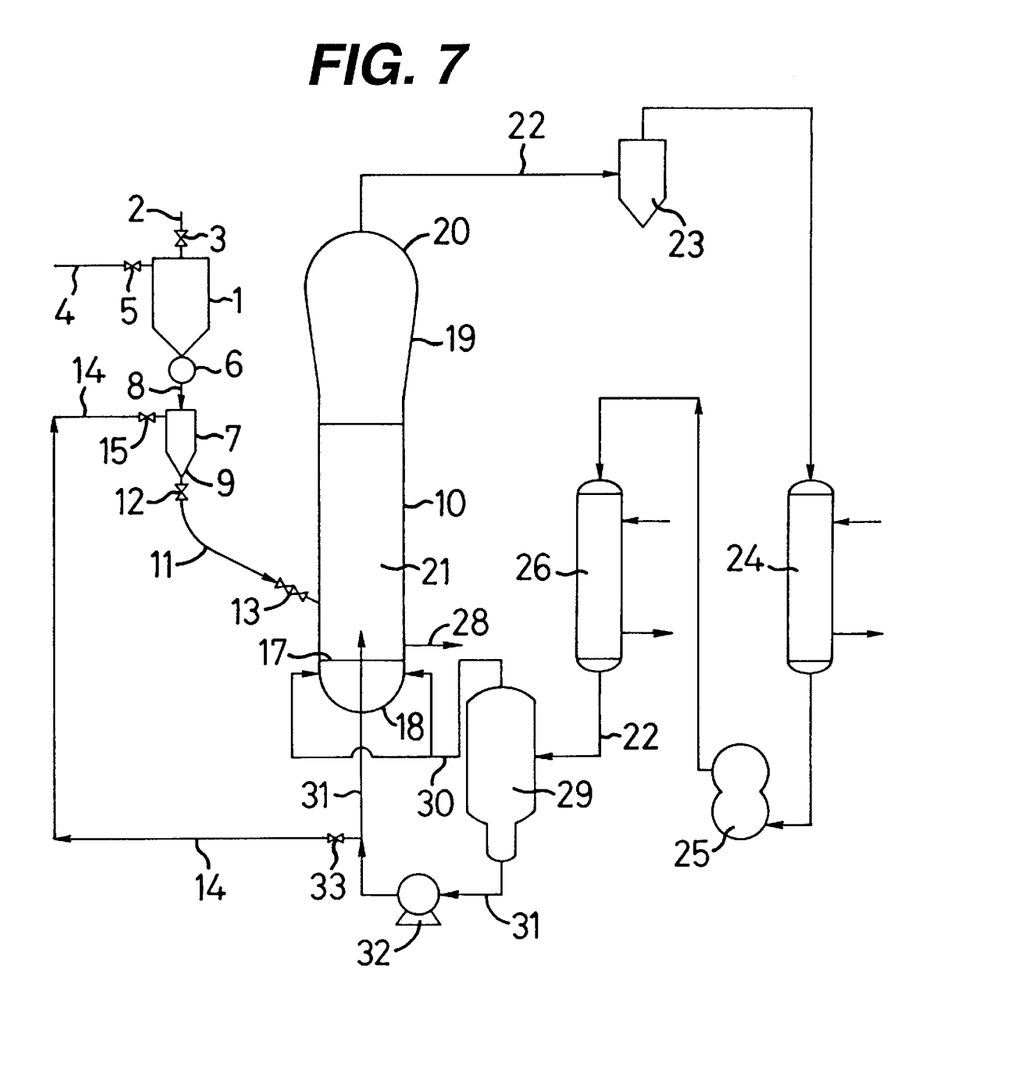

FIG. 7 diagrammatically represents another gas-phase olefin polymerization installation which uses the device for introduction of catalyst as represented in FIG. 3 with the same components and the same references. The polymerization installation is identical to that represented in FIG. 6 with the same references, except for the fact that the line (22) for recycling the gaseous reaction mixture comprises, after the second heat exchanger (26), a gas/liquid separator (29), such as that described in Patent Application PCT No. WO 94/28032, containing, in the upper part, the start of a line (30) which makes it possible to recycle the gaseous reaction mixture directly to the bottom (18) of the reactor under the fluidization grid (17) and, in the lower part, the start of a line (31) equipped with a pump (32) which makes it possible for the liquid separated from the gaseous reaction mixture to be conveyed directly into the bed (21), in particular into the region of the bed where the temperature is substantially constant and highest. A line (14) equipped with a valve (33) leaves from the portion of the line (31) located after the pump (32), which line (14) makes it possible to withdraw a part of the liquid which is conveyed into the chamber (7) of the device for introduction of the catalyst. This installation is particularly advantageous when it operates according to the process described in WO 94/28032, that is to say when the gaseous reaction mixture is cooled in the heat exchanger (26) below its dew point, so as to form a mixture of gas and of liquid, and when the gas is separated from the liquid in the separator (29). This installation is in addition particularly useful when it is used in combination with the process for introduction of catalyst according to the present invention, operating in particular with a portion of the liquid separated from the gas in the separator (29). This portion of the liquid is introduced continuously into the mixing chamber (7), so as to form a continuous stream passing through the chamber (7) as far as into the reactor (10) via the pipe (11) and so as to add measured amounts of catalyst to this stream in the chamber in order to form a catalyst suspension entrained with the stream into the reactor (10) via the pipe (11).

Figure 8:
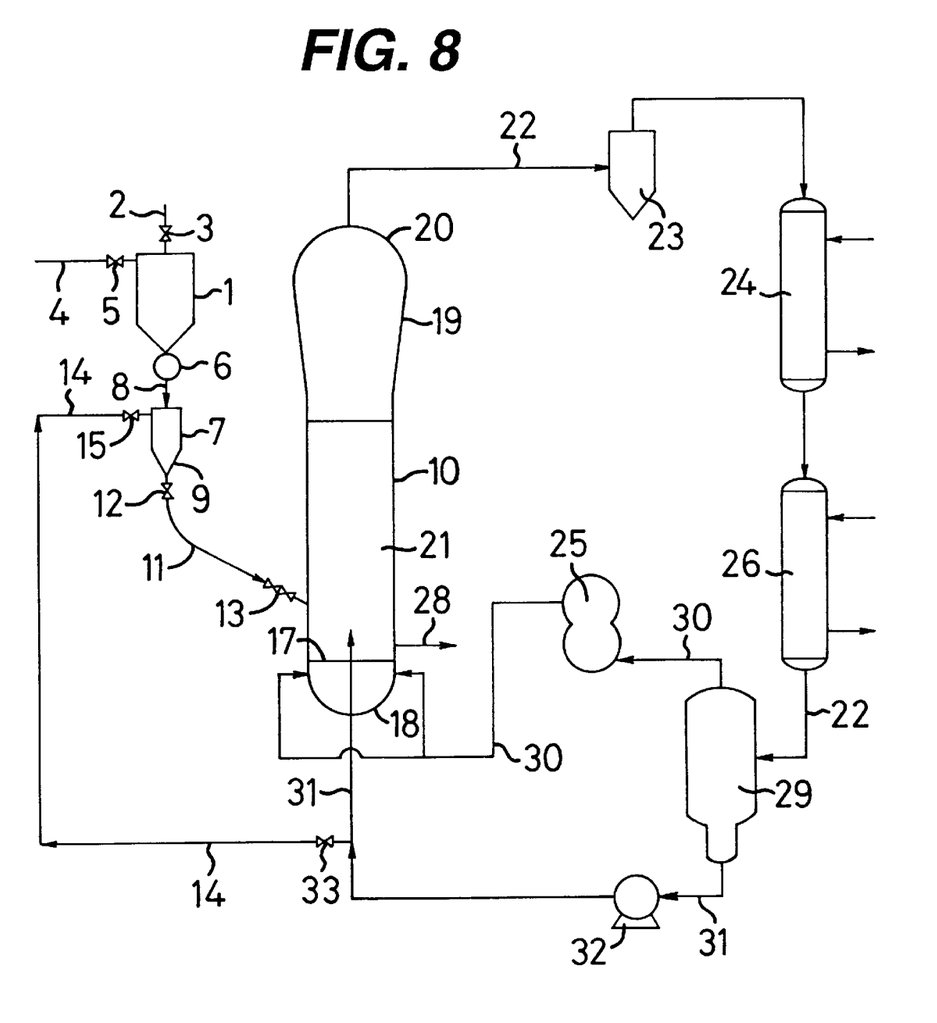

FIG. 8 diagrammatically represents an alternative form of the polymerization installation as represented in FIG. 7 with the same components and the same references but arranged differently. The line (22) for recycling the to gaseous reaction mixture comprises, after the first heat exchanger (24), the second exchanger (26) and then, subsequently, the gas/liquid separator (29). A line (30) equipped with the compressor (25) leaves via the top of the separator (29), which line (30) recycles the gaseous reaction mixture separated from the liquid directly to the bottom (18) of the reactor under the fluidization grid (17). A line (31) equipped with a pump (32) leaves from the bottom of the separator (29), which line (31) conveys the liquid separated from the gas directly into the bed (21), in particular into the region of the bed where the temperature is substantially constant and highest. A line (14) equipped with a valve (33) leaves from the portion of the line (31) located after the pump (32), which line (14) makes it possible to withdraw a part of the liquid which is conveyed into the chamber (7) of the device for introduction of the catalyst. This installation is particularly advantageous when it operates according to the process described in WO 94/28032, in particular as described above for FIG. 7. This installation is also particularly useful when it is used in combination with the process for introduction of catalyst according to the present invention, in particular as described above for FIG. 7.

Figure 9:
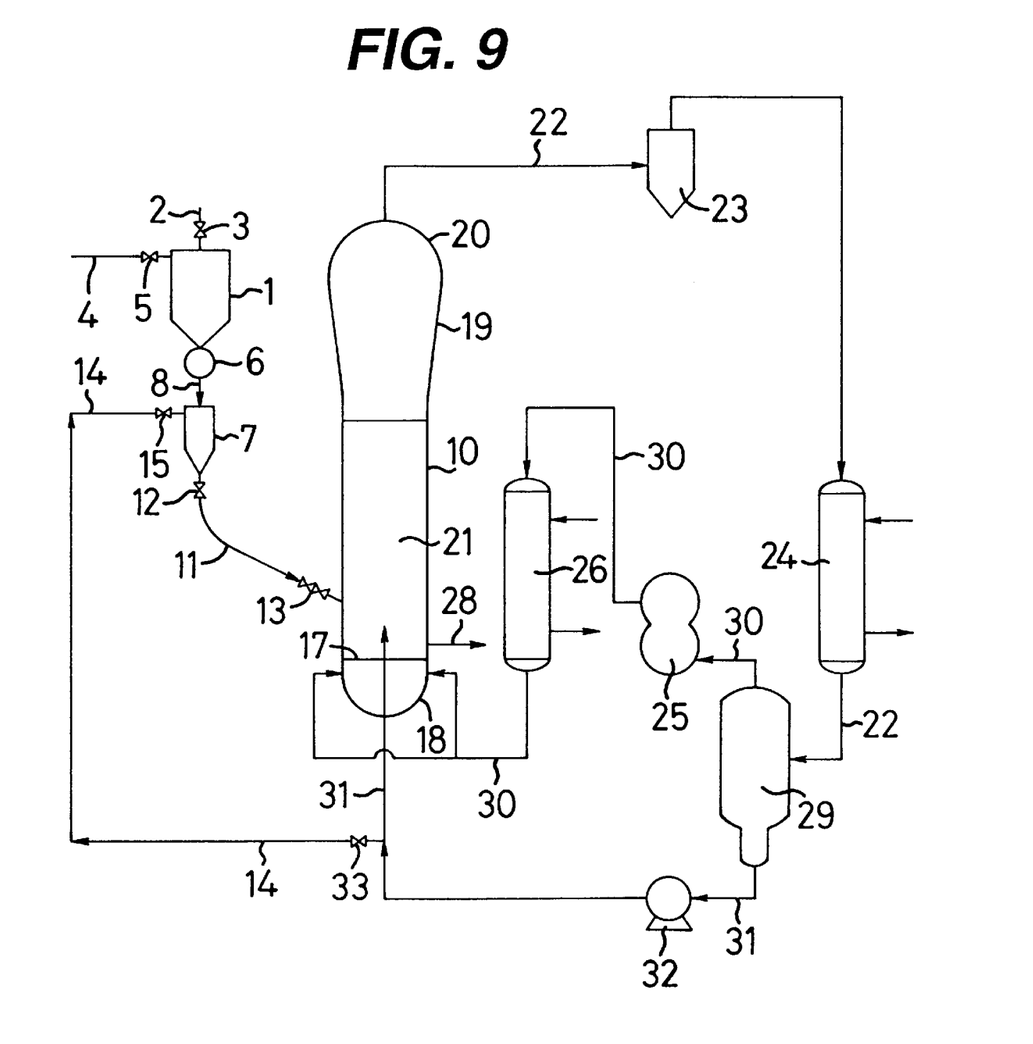

FIG. 9 diagrammatically represents another alternative form of the polymerization installation as represented in FIG. 7 with the same components and the same references but arranged differently. The line (22) for recycling the gaseous reaction mixture comprises, after the first heat exchanger (24), the gas/liquid separator (29). A line (30) equipped with the compressor (25) and then with the second heat exchanger (26) leaves via the top of the separator (29), which line recycles the gaseous reaction mixture separated from the liquid directly to the bottom (18) of the reactor under the fluidization grid (17). A line (31) equipped with a pump (32) leaves from the bottom of the separator (29), which line (31) conveys the liquid separated from the gas directly into the bed (21), in particular into the region of the bed where the temperature is substantially constant and highest. A line (14) equipped with a valve (33) leaves from the portion of the line (31) located after the pump (32), which line (14) makes it possible to withdraw a part of the liquid which is conveyed into the chamber (7) of the device for introduction of the catalyst. This installation is particularly advantageous when it operates according to the process described in WO 94/28032, in particular as described above for FIG. 7, except for the fact that the first exchanger (24) cools the gaseous reaction mixture below its dew point. This installation is also particularly useful when it is used in combination with the process for introduction of catalyst according to the present invention, in particular as described above for FIG. 7.

The process for introduction of catalyst according to the present invention is very particularly suitable for the continuous gas-phase polymerization of one or a number of olefins, optionally as a mixture with a diene, in particular in a fluidized bed reactor, under an (absolute) pressure P2 ranging from 0.2 to 6 MPa and preferably from 1 to 4 MPa. The polymerization temperature and in particular the temperature of the fluidized bed can be kept at a value ranging from 30 to 130° C. and preferably from 50 to 110° C. A gaseous reaction mixture passes through the reactor with an ascending velocity which can range from 0.3 to 0.9 m/s and preferably from 0.4 to 0.8 m/s. The gaseous reaction mixture can contain one or a number of olefins, in particular $C_2$ to $C_{10}$ and preferably $C_2$ to $C_8$ olefins, optionally with a non-conjugated diene, for example ethylene or propylene, or a mixture of ethylene with at least one $C_3$ to $C_{10}$ and preferably $C_3$ to $C_8$ olefin, for example propylene, 1-butene, 1-hexene, 4-methyl-1-pentene or 1-octene, and/or alternatively with at least one diene, for example a non-conjugated diene such as ethylidenenorbornene, 4-methyl-1,4-hexadiene, 2-methyl-1,5-hexadiene or 1,4-hexadiene. It can also contain hydrogen and/or at least one inert gas such as nitrogen or an alkane or cycloalkane, for example a $C_2$ to $C_8$ alkane or cycloalkane. The polymerization process can in particular be carried out according to the process described in Patent Application PCT No. WO 94/28032.

The polymerization process which uses the process for introduction of catalyst according to the invention is very particularly suitable for manufacturing polyolefins in the powder form, in particular linear low density or high density polyethylene, with a density ranging for example from 0.87 to 0.97, or polypropylene, or copolymers of propylene with ethylene and/or $C_4$ to $C_8$ olefins, or elastomeric copolymers of propylene with ethylene and optionally at least one non-conjugated diene with a density ranging, for example, from 0.85 to 0.87.

The following example illustrates the present invention.

EXAMPLE 1

The process is carried out with an installation such as that represented in FIG. 6, in which ethylene is copolymerized with 1-butene in the gas phase. The gaseous reaction mixture moving in the reactor (10) contains ethylene, 1-butene, hydrogen, nitrogen, ethane, n-pentane and isopentane under a total pressure of 2 MPa and at an ascending velocity of 0.55 m/s. The polymerization temperature in the fluidized bed is 93° C. A catalyst based on titanium, magnesium and chlorine is used, as described in Example 1 of Patent Application FR-2,706,467. The catalyst is stored in the hopper (1) in the form of a dry powder composed of particles having a mean diameter by mass of 45 µm and kept under a nitrogen atmosphere under a pressure of 2.7 MPa. The pair of valves (13) remains constantly open. At the start of the cycle of operations for introducing the catalyst into the reactor, the valves (12) and (15) are closed. The valve (12) is first of all opened and then the valve (15) is opened immediately afterwards, allowing a 0.8 liter liquid mixture of n-pentane and of isopentane to enter into the chamber (7) under a pressure of 2.5 MPa. Immediately after opening the valve (15), 40 g of the catalyst, withdrawn from the hopper (1), are introduced via the measuring zone (6), are suspended in the liquid mixture and are entrained in the form of a suspension via the pipe (11) with an internal diameter of 14 mm.

The valve (12) and then the valve (15) are then closed. The total period of time for suspending the catalyst and for introducing it into the reactor is 2 seconds. The cycle of the operations for introduction of the catalyst is completed and a new cycle is ready to be carried out. Under these conditions, it is observed that the entrainment of the fine particles out of the fluidized bed is low and that the polymerization takes place satisfactorily.

I claim:

1. A process for introducing a solid catalyst into a gas-phase olefin polymerization reactor through which passes a gaseous reaction mixture containing at least one olefin to be polymerized, which process comprises:
   (a) storing under an inert atmosphere a solid catalyst in the form of a dry powder in a hopper;
   (b) withdrawing under an inert atmosphere from the hopper a measured amount of the catalyst in the form of a dry powder;
   (c) introducing the measured amount of the catalyst in the form of a dry powder into a mixing chamber, and introducing a liquid hydrocarbon into the mixing chamber to create a vortical or cyclonic liquid stream;
   (d) mixing said measured amount of the catalyst with said liquid hydrocarbon in the mixing chamber so as to form in said chamber a suspension of the entrained catalyst with said liquid hydrocarbon; and
   (e) introducing said suspension into a gas-phase olefin polymerization reactor.

2. A process for introducing a solid catalyst into a gas-phase olefin polymerization reactor through which passes a gaseous reaction mixture containing at least one olefin to be polymerized, which process comprises:
   (a) storing under an inert atmosphere a solid catalyst in the form of a dry powder in a hopper;
   (b) withdrawing under an inert atmosphere from the hopper a measured amount of the catalyst in the form of a dry powder;
   (c) continuously introducing a liquid hydrocarbon into a mixing chamber so as to form a continuous stream of the liquid hydrocarbon passing through the chamber and flowing into a gas-phase olefin polymerization reactor such that a vortical of cyclonic stream is formed in the chamber;
   (d) adding the measured amount of the catalyst in the form of a powder to the continuous stream of the liquid hydrocarbon in the mixing chamber so as to mix said measured amount of said catalyst with said liquid hydrocarbon and to form in said chamber a suspension of said catalyst with said liquid hydrocarbon; and
   (e) introducing said suspension entrained by the continuous stream of the liquid hydrocarbon into the gas-phase olefin polymerization reactor.

3. Process according to claim 1 or 2, wherein the catalyst contains a transition metal belonging to group IV, V or VI of the Periodic Classification of the elements.

4. Process according to claim 1 or 2, wherein the liquid hydrocarbon is a liquid which is volatile under polymerization conditions in the gas-phase polymerization reactor.

5. Process according to claim 1 or 2, wherein the liquid hydrocarbon is at least one saturated $C_2$ to $C_8$ hydrocarbon or at least one liquid $C_2$ to $C_{10}$ olefin or non-conjugated diene or a mixture of one or a number of $C_2$ to $C_{10}$ olefins or dienes with at least one saturated $C_2$ to $C_8$ hydrocarbon.

6. Process according to claim 1 or 2, wherein the liquid hydrocarbon is at least a portion of a liquid obtained by cooling and condensation of at least a part of a gaseous reaction mixture which passes through the polymerization reactor and is returned to the gas-phase olefin polymerization reactor, and by separation of the cooled gaseous reaction stream which is recycled to said reactor.

7. Process according to claim 1 or 2, wherein the liquid hydrocarbon is introduced into the mixing chamber under a pressure greater than that existing in the polymerization reactor.

8. Process according to claim 1 or 2, wherein the liquid hydrocarbon is introduced into the mixing chamber under a pressure less than or equal to that existing in the hopper for storing the catalyst.

9. Process according to claim 1 or 2, wherein the gas-phase olefin polymerization reactor is a fluidized bed reactor and the suspension is introduced directly into the bed.

10. Process according to claim 1 or 2, wherein the measured amount of the catalyst in dry powder form is intermittently withdrawn from the hopper.

11. Process according to claim 10, wherein the measured amount of the catalyst in dry powder form is periodically withdrawn from the hopper.

* * * * *